No. 627,026. Patented June 13, 1899.
P. B. VIELE.
EVAPORATING AND CONDENSING APPARATUS.
(Application filed Feb. 24, 1898.)
(No Model.)
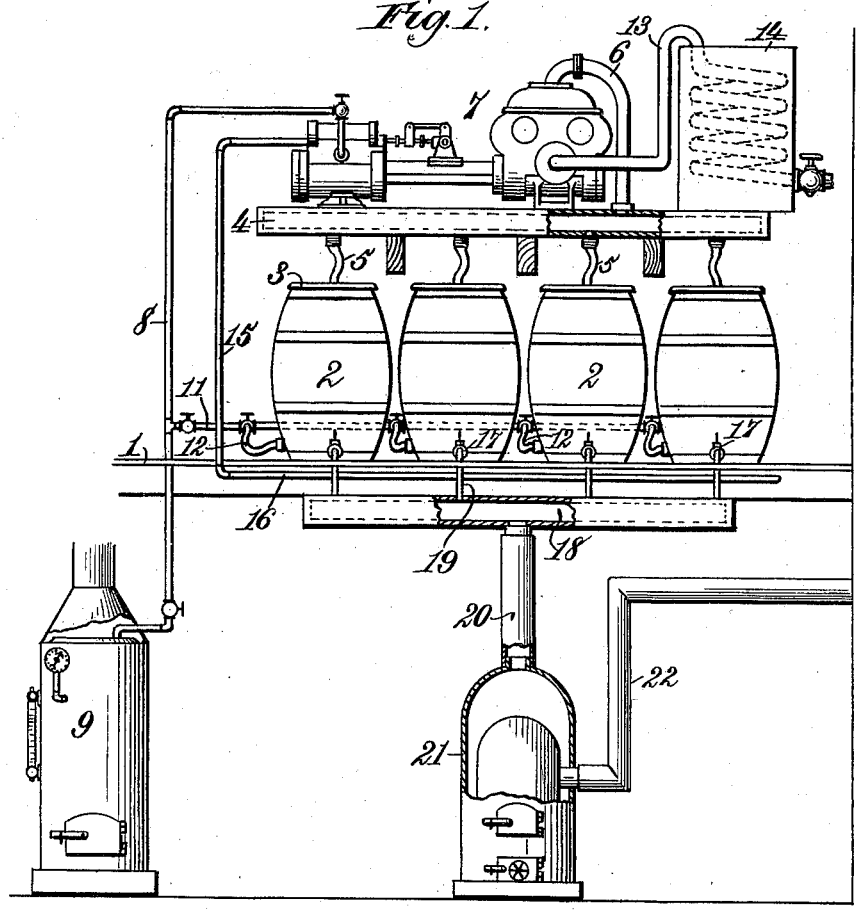
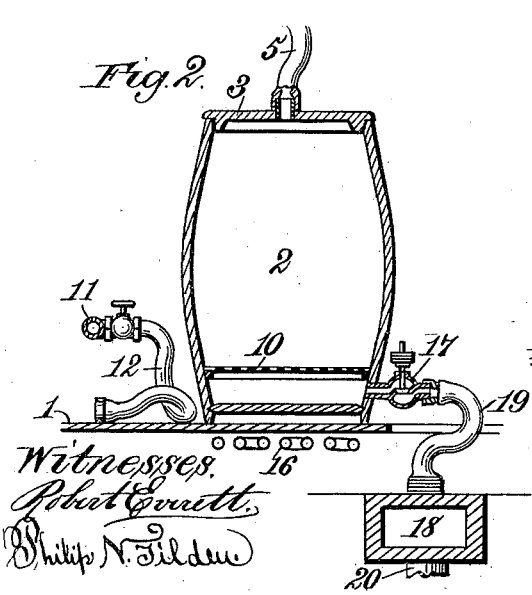
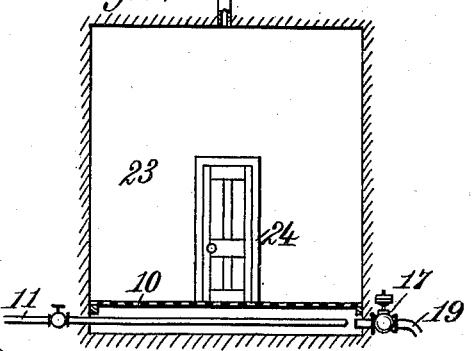
Witnesses,
Robert Everett.
Philip N. Tilden.
Inventor,
Platt B. Viele.
By James L. Norris
Atty.

UNITED STATES PATENT OFFICE.

PLATT B. VIELE, OF ROCHESTER, NEW YORK.

EVAPORATING AND CONDENSING APPARATUS.

SPECIFICATION forming part of Letters Patent No. 627,026, dated June 13, 1899.

Application filed February 24, 1898. Serial No. 671,522. (No model.)

*To all whom it may concern:*

Be it known that I, PLATT B. VIELE, a citizen of the United States, residing at Rochester, in the county of Monroe and State of New York, have invented new and useful Improvements in Evaporation Processes, of which the following is a specification.

This invention relates to a process for evaporation or drying of various materials and condensation of eliminated moisture and juices, especially for evaporating fruits, berries, and vegetables and for drying tobacco, lumber, and other products.

It is well known that a quick evaporation of fruit is best for preserving the color, and in drying operations generally it is desirable to effect a saving of time.

One of the objects of my invention is to accomplish desired evaporating and drying operations by a vacuum process in conjunction with steaming and heating, whereby vapors and moisture are speedily eliminated from the substances under treatment.

It is another object of my invention to condense the moisture and volatile juice essence driven off from the evaporated fruit, thereby obtaining rectified fruit-juices.

In carrying out my invention I employ an apparatus of the character illustrated in the annexed drawings, in which—

Figure 1 is a part sectional elevation of the vacuum evaporating and condensing apparatus. Fig. 2 is an enlarged vertical section of one of the evaporating casks, tanks, or chambers. Fig. 3 is a view showing the application of the invention to an apartment or chamber for drying tobacco, lumber, or bulky material.

In the form of apparatus shown in Fig. 1 the reference-numeral 1 may designate a platform or upper floor, on which is supported a cask, tank, or chamber 2, any desired number of which may be provided to receive such fruits, substances, or materials that are to be dried or evaporated. Each cask, tank, or chamber 2 has a strong and tight-fitting cover 3, that may be provided with suitable packing, if desired. Where a number of these casks or tanks are placed together, there is arranged above them an exhaust-chamber 4, with which the top of each tank or cask communicates through a suitable pipe 5 or a flexible hose connection. This exhaust-chamber 4 has attached to it a suction-pipe 6, that connects with a vacuum-pump 7 of any suitable construction. The vacuum-pump 7 may be mounted on the exhaust-chamber 4 or elsewhere, as convenient. For the purpose of operating the vacuum-pump steam may be taken by a pipe 8 from a boiler 9, located at any convenient point. By means of the vacuum-pump air and moisture can be quickly and thoroughly exhausted from whatever material may be placed in the casks, tanks, or chambers with which the pump connects. In the lower part of each cask, tank, or receptacle 2 there is a perforated false bottom 10, on which may rest the materials to be dried or evaporated.

For the evaporation of fruits, berries, and vegetable substances when placed in the casks, tanks, or receptacles 2 I take live steam from the boiler steam-delivery pipe 8 and conduct it through a pipe 11 and branches or hose connections 12 into the lower part of each cask below its perforated false bottom 10, to be drawn upward through the fruit or other material in the cask when the vacuum-pump is in operation. The drawing of steam through the fruit by the action of the vacuum-pump will free the moisture and facilitate evaporation. The moisture and vapors thus eliminated will be conducted from the vacuum-pump through a pipe 13 and be thereby conveyed to a condenser 14, from which the rectified fruit-juices may be drawn off.

For the purpose of heating the casks or receptacles 2 I may take exhaust-steam from the vacuum-pump 7 and conduct it through a pipe 15 into coils 16, located beneath said receptacles.

The lower part of each cask, tank, or chamber is provided with a hot-air inlet controlled by a preferably weighted valve 17, so arranged that when the said valve is open hot air will be drawn by action of the vacuum-pump 7 from a hot-air chamber 18 through suitable pipes or hose attachments 19, connecting with the valved hot-air inlets of the several casks. The hot air thus drawn through the material in the casks or tanks will expel all moisture and greatly facilitate and hasten the evaporating and drying operations. The hot-air chamber 18 is supplied through a pipe 20 from a hot-air furnace 21, located below the floor or platform on which the evaporating casks, tanks, or chambers 2 are arranged. A smoke-pipe 22 is connected with the hot-air furnace. By differently weighting the valves 17 or otherwise adjusting them the volume of hot air passed through the evaporating tanks, chambers, or casks can be controlled as desired.

The fruits or other vegetable materials to be evaporated are placed in the receptacles or casks 2 and the covers thereof are then made tight. These casks or receptacles are now connected with the exhaust-chamber 4 and the vacuum-pump 7 is put into operation. By this means the air and moisture are exhausted, and while the vacuum-pump is still in operation live steam is admitted through the pipe 11 and hose connections 12 into the lower part of each cask or tank below its perforated false bottom. Subsequently or together with the steam hot air is admitted from the hot-air chamber 18, the vacuum-pump being still in operation, and thus by the conjoint action of these agents the process of evaporation and drying is quickly effected in such manner as to preserve to a large extent the natural flavor and desirable qualities of the fruits or vegetables under treatment. The fruit-juices carried off with the moisture and vapor are saved by condensation, thus contributing to the economy of the process. The use of exhaust-steam to assist in heating the casks will result in economy of fuel.

In Fig. 3 I have shown part of an evaporating and drying apparatus in which a large apartment or chamber 23 is arranged for the drying of tobacco, wool, beans, leather, clothing, and various materials in bulk. A door 24 is provided for access to this enlarged drying chamber or apartment, and provision is made for connection with a vacuum-pump and with steam and hot-air supply in the manner already described. Apparatus of this character may be used to advantage for quickly drying lumber as well as various other materials.

It will be obvious that changes may be made in the form, dimensions, and location of the parts of the apparatus according to the particular requirements of the substances to be subjected to an evaporating or drying operation. By subjecting the materials under treatment to the action of steam and hot air and exhausting the air and moisture all impurities and germs are destroyed or removed and the operation of drying is facilitated and hastened.

What I claim as my invention is—

The process of evaporating and drying fruits and collecting the fruit-juices, which consists in exhausting the air and moisture from the fruit, drawing steam through the fruit, then drawing heated air through the fruit, and finally condensing the vapors to collect and save the fruit-juices, substantially as described.

In testimony whereof I have hereunto set my hand in presence of two subscribing witnesses.

PLATT B. VIELE.

Witnesses:
WM. E. CRAIB,
HECTOR MCLEAN.